Patented June 7, 1932

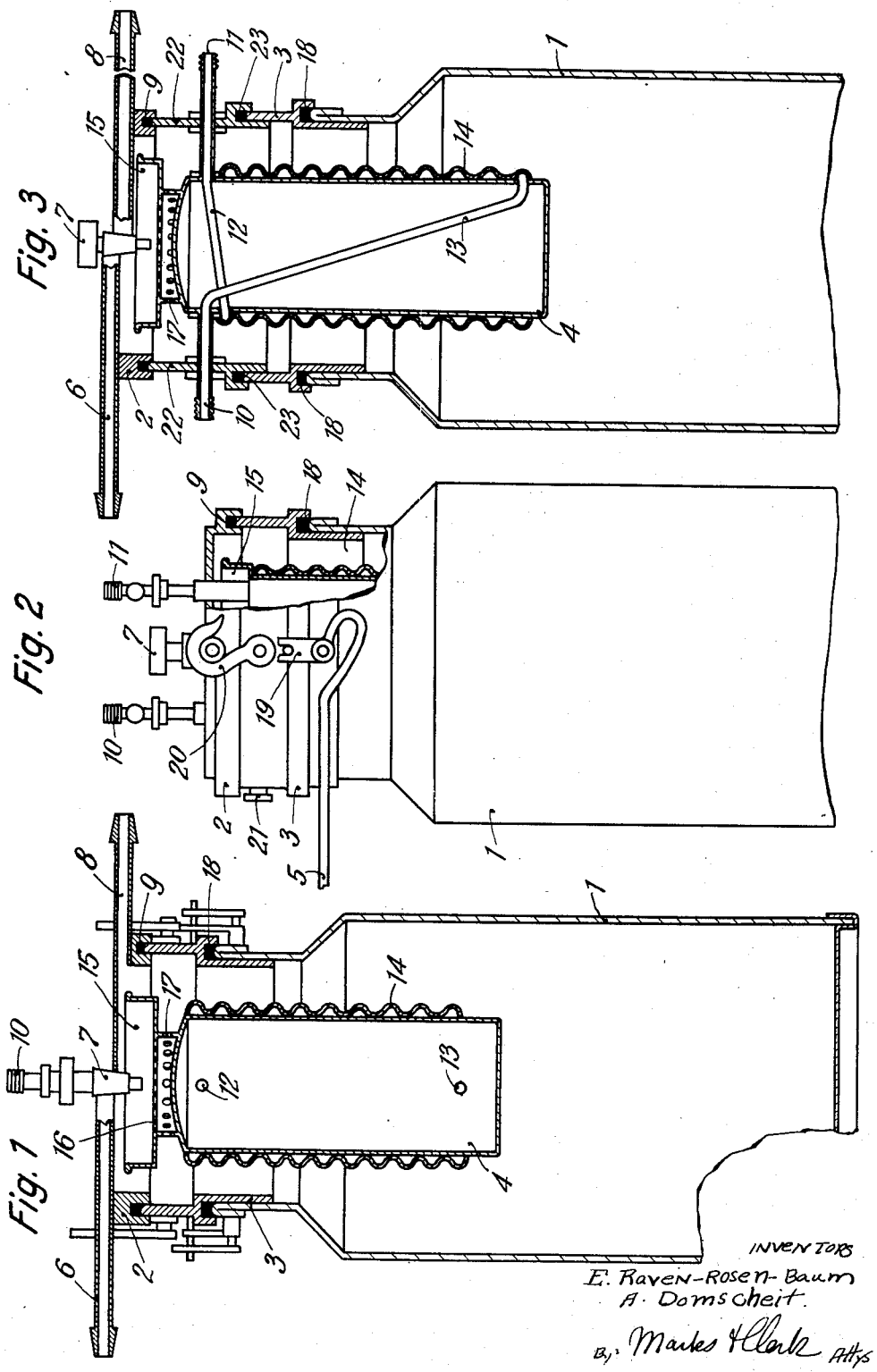

1,861,898

UNITED STATES PATENT OFFICE

EUGEN RAVEN-ROSEN-BAUM, OF GUT RAVENHORST, AND ALFRED DOMSCHEIT, OF JUTERBOG, GERMANY

COOLING DEVICE FOR MILK RECEIVING CONTAINERS OF VACUUM MILKING MACHINES

Application filed December 11, 1930, Serial No. 501,644, and in Germany December 12, 1929.

Our invention relates to: cooling device for milk receiving containers of vacuum milking machines.

Milking machines have become known, through which the milk obtained by vacuum is conducted into containers without access of atmospheric air, the milk being at the same time screened and cooled by means of separate devices and freed from the minute air bubbles of the milking process by means of the vacuum.

Arrangements of this kind possess however the disadvantage, that the milk drawn from the cow is submitted to this treatment in a separate vessel. This is disadvantageous, as by the use of such a separate vessel, which is difficult to keep free from germs, the danger of an infection of the milk consists. This disadvantage is obviated by this invention, which consists in that, that screening, cooling and freeing the milk of the minute air bubbles of the milking process of the milk obtained in this manner is effected directly in the milk receiving container of the vacuum milking machine. With this object in view a cooling device is inserted in the milk receiving container, which cooling device is arranged either on the air-tightly closing lid of the milk receiving container, or on an intermediate element of a suitable form, to be air-tightly inserted between the milk receiving container and the lid of same. For completely filling the milk receiving container, a second intermediate element is air-tightly inserted between aforedescribed intermediate element and the milk receiving container, in order to ensure a compensation for the volume of milk displaced by the cooling device, so that the milk drawn from the cow can rise above the rim of the milk receiving container to flow back to the usual level after the upper intermediate element with the cooling device on the same has been removed from the receiving container, and the latter can be closed by a lid for transport or tapping. By the arrangement of extensions of suitable form on the end of the intermediate elements to be placed on the receiving container it becomes possible, to use milk vessels of different size for the purpose of receiving containers. A screening device is preferably arranged above the cooler.

Several embodiments of the invention are illustrated by way of example in the accompanying drawing in which:

Fig. 1 shows in section an arrangement according to the invention ready for use, comprising a cooling device mounted on the lid and an intermediate element inserted between the lid and the receiving container.

Fig. 2 shows an elevation partly in section of the arrangement shown in Fig. 1 viewed at right angles to this Fig. 1.

Fig. 3 shows in section a modified arrangement ready for use, comprising a cooling device fixed on an intermediate element of a suitable shape, and a second intermediate element.

In the drawing 1 designates the milk receiving container, 2 the lid, 3 an intermediate element of a suitable shape air-tightly inserted between the lid and container, for equalizing the level of the milk in the container, 4 the cooling device connected with the lid, 5 the bow-shaped handle of the container 1 serving at the same time as closing device, 6 a milk inflow tube on the lid leading to a cock 7, 8 a vacuum tube, 9 a packing ring on the lid 2 for air-tight closure with the intermediate element 3, 10 and 11 are inflow and outflow for the cooling medium communicating with the cooling device 4, the cooling medium being conducted into the cooling jacket through pipes 12 and 13, 14 is the outer cooling envelope preferably made of undulated sheet metal, 15 is a milk distributing lid arranged above the cooler and provided at the bottom with a screening device 16, from which the milk flows through a sieve partition 17 and over the cooling device 4, 18 is a packing on the intermediate element 3 for air-tightly closing the milk receiving container, 19 are extensions on the intermediate element 3 for coupling with the bow-shaped handle 5 in order to air-tightly connect the same with the container 1, 20 are hooks for the same purpose for connecting the intermediate element 3 with the lid 2, said hooks gripping over the pipes 6 or 8 respectively, 21 is a show-glass on the intermediate element to indicate the filling of the container and to permit the observing of the inflowing milk.

In the form of construction shown in Fig. 3 the cooling system is arranged on a separate collar 22, air-tightly inserted between the lid 2 and a second intermediate element 3, the air-tight closure between collar 22 and intermediate element 3 is effected by a packing 23. This form of construction is practical when, as mentioned above, the device has to be adapted to existing milk vessels.

We claim:

1. A cooling device for milk receiving containers of vacuum milking machines, comprising in combination with the milk receiving container a lid for said container, a milk supply tube on said lid, an intermediate element of a suitable shape adapted to be air-tightly inserted between said container and said lid for equalizing the level of the milk in the container, and a cooling device of known type fixed on said lid.

2. A cooling device for milk receiving containers of vacuum milking machines, comprising in combination with the milk receiving container, a lid for said container, a milk supply tube on said lid, an intermediate element of a suitable shape adapted to be air-tightly connected on its upper end to said lid, a cooling device fixed on said intermediate element, and a second intermediate element of a suitable shape adapted to be air-tightly inserted between the first said intermediate element and said container, for equalizing the level of the milk in the container.

In testimony whereof we have signed our names to this specification.

EUGEN RAVEN-ROSEN-BAUM.
ALFRED DOMSCHEIT.